United States Patent
Munoz Delgado

(10) Patent No.: US 12,469,283 B2
(45) Date of Patent: Nov. 11, 2025

(54) GENERATION OF SEMANTICALLY MODIFIED VARIATIONS OF IMAGES WITH TRANSFORMER NETWORKS

(71) Applicant: Robert Bosch GmbH, Stuttgart (DE)

(72) Inventor: Andres Mauricio Munoz Delgado, Schoenaich (DE)

(73) Assignee: ROBERT BOSCH GMBH, Stuttgart (DE)

(*) Notice: Subject to any disclaimer, the term of this patent is extended or adjusted under 35 U.S.C. 154(b) by 294 days.

(21) Appl. No.: 18/449,191

(22) Filed: Aug. 14, 2023

(65) Prior Publication Data

US 2024/0062543 A1 Feb. 22, 2024

(30) Foreign Application Priority Data

Aug. 19, 2022 (DE) ...................... 10 2022 208 617.1

(51) Int. Cl.
*G06K 9/00* (2022.01)
*G06T 7/11* (2017.01)
(Continued)

(52) U.S. Cl.
CPC ............... *G06V 20/41* (2022.01); *G06T 7/11* (2017.01); *G06V 10/462* (2022.01);
(Continued)

(58) Field of Classification Search
CPC ...... G06N 20/00; G06N 3/006; G06F 21/602; G06F 21/64; G06F 16/22; G06F 16/2379;
(Continued)

(56) References Cited

U.S. PATENT DOCUMENTS

| | | | | |
|---|---|---|---|---|
| 2016/0364474 A1* | 12/2016 | Bay | ........................ | G06F 16/148 |
| 2023/0274478 A1* | 8/2023 | Turgutlu | .............. | G06V 10/454 |
| | | | | 345/629 |
| 2023/0281400 A1* | 9/2023 | Wang | .................... | G06F 40/284 |
| | | | | 704/2 |

FOREIGN PATENT DOCUMENTS

DE 102021200877 A1 8/2022

OTHER PUBLICATIONS

Huiwen Chang, Han Zhang, Lu Jiang, Ce Liu, William T. Freeman, MaskGIT: Masked Generative Image Transformer, arXiv: 2202.04200v1, Feb. 8, 2022 (Year: 2022).*

(Continued)

*Primary Examiner* — Alex Kok S Liew
(74) *Attorney, Agent, or Firm* — NORTON ROSE FULBRIGHT US LLP

(57) ABSTRACT

A method for generating a semantically modified variation of an image. In the method: the image is divided into equally sized, non-overlapping patches; the patches are converted with a patch encoding function of a transformer network into a chain of tokens in a workspace; the tokens are grouped into preservation tokens, whose information is to be preserved in the variation, and masked tokens, whose information is to be masked in the variation; the preservation tokens are converted with an encoder of the transformer network into a chain of processed tokens; the chain is supplemented through application of an insertion operator that inserts these masked tokens at positions corresponding to the positions of the masked tokens in the original chain to form a chain that represents the sought variation; the chain is converted with a decoder of the transformer network into the sought variation.

16 Claims, 3 Drawing Sheets

(51) Int. Cl.
 *G06V 10/46* (2022.01)
 *G06V 10/764* (2022.01)
 *G06V 20/40* (2022.01)
 *H04L 9/32* (2006.01)
 *H04N 19/176* (2014.01)

(52) U.S. Cl.
 CPC .......... *G06V 10/764* (2022.01); *H04L 9/3213* (2013.01); *H04N 19/176* (2014.11)

(58) Field of Classification Search
 CPC .. G06F 16/9024; G06F 16/904; G06F 16/906; G06F 16/951; G06F 16/16; G06F 16/2455; G06F 16/256; G06T 2207/10136; G06T 2207/20081; G06T 7/0012; G06T 7/11; G06V 10/462; G06V 10/764; G06V 10/7753; G06V 10/82; G06V 20/41; G06V 20/582
 See application file for complete search history.

(56) References Cited

OTHER PUBLICATIONS

Chang, et al.: "MaskGIT: Masked Generative Image Transformer," arXiv:2202.04200, (2022), pp. 1-23, URL:https://arxiv.org/pdf/2202.04200.

\* cited by examiner

GENERATION OF SEMANTICALLY MODIFIED VARIATIONS OF IMAGES WITH TRANSFORMER NETWORKS

CROSS REFERENCE

The present application claims the benefit under 35 U.S.C. § 119 of German Patent Application No. DE 10 2022 208 617.1 filed on Aug. 19, 2022, which is expressly incorporated herein by reference in its entirety.

FIELD

The present invention relates to the generation of variations of images that can be used, in particular, to analyze the behavior of classifiers.

BACKGROUND INFORMATION

In many applications, especially in the field of at least partially automated driving and quality control in the series production of products, images are processed with image classifiers. For example, images of a vehicle surrounding environment are classified according to which objects are present in the images. In quality control, images of products are classified to determine whether the product is free of defects or whether it has defects or damage.

To assess the reliability of such systems, it is important to know which image features the image classifier bases its decision on. In particular, the decision should be a function primarily of the content of image areas that are actually relevant to the application in question. For example, a system that recognizes traffic signs should actually base its decision on traffic signs and not on, for example, neon signs or other objects that are not relevant to traffic.

To test the decision limits of image classifiers, semantically modified variations of an image are frequently used. It is analyzed how and where the image has to be modified at least such that the image classifier assigns it to a different class than it did previously.

SUMMARY

The present invention provides a method for generating a semantically modified variation T of an image I. The image I may in particular be, for example, a camera image, a video image, a radar image, a lidar image, an ultrasonic image, or a thermal image.

According to an example embodiment of the present invention, during this process, the image is divided I into patches of equal size that do not overlap p. These patches p are converted with a patch encoding function $E_p$ of a transformer network into a chain R of tokens r in a workspace. A token r is therefore a representation of a patch p in the workspace.

The tokens r are grouped into preservation tokens $r_1$, whose information is to be preserved in the variation, and masked tokens $r_2$, whose information is to be masked in the variation.

Thus, for each token r a binary decision is made as to whether the information contained in it is included in the variation or not.

The preservation tokens $r_1$ are converted with an encoder E of the transformer network into a chain R* of processed tokens $r_1$*.

This chain R* is supplemented through the application of an insertion operator D, to form a chain R which represents the sought variation. For this purpose, the insertion operator $D_p$ inserts these masked tokens $r_2$ at positions corresponding to the positions of the masked tokens $r_2$ in the original chain R. The chain R then contains a mixture of
- information from preservation tokens $r_1$ which has been processed by the encoder E of the transformer network on the one hand, and
- information from masked tokens $r_2$ which has not been processed by this encoder E on the other hand.

The chain R** is converted with a decoder D of the transformer network into the sought variation T.

Thus, the classification of a token r as a masked token $r_2$ has the effect that in the workspace the processing by the encoder E of the transformer network is omitted. Thus, during the creation of the chain R* the information contained in the masked token $r_2$ is withheld from the encoder E.

In the generation of semantically modified variations of images, there is basically a conflict of goals in that, on the one hand, certain information is to be deleted from the image and, on the other hand, through this removal no additional information is to be inserted into the image that is not contained in the original image. For example, if certain image pixels that belong to a distracting beverage can in the image are replaced by a minimum or maximum available value (in a grayscale image, for example, by full black or white), these replaced image pixels are clearly visible as a spot that was not there before. This is not the same as if the picture had been taken without the beverage can in the first place.

It has been recognized that masking information in the manner described solves this conflict of goals well for many applications. That is, the masked information is removed from the variation T in such a way that it is highly probable that a downstream image classifier will not react to the modification of the image as such. Thus, when investigating from what modification a downstream image classifier changes its decision, it is really only the response to the absence of the masked information that is measured. It can thus be inferred that the decision of the image classifier is actually a function of exactly this information.

According to an example embodiment of the present invention, particularly advantageously, a prespecified number N of masked tokens $r_2$
- can be selected at random and/or
- on the basis of a prespecified geometric pattern, and/or
- as a function of the semantic content of the image I.

In this way, for example, by decreasing the number N stepwise it is possible to ascertain how much information at least must be masked in order to change the decision of the image classifier.

In a further particularly advantageous embodiment of the present invention, the decoder D is additionally assigned a class label $g^*(I)$ or $g_c^*(T) \neq g^*(I)$ which represents an assignment of the image for its variation T to one or more classes of a prespecified classification. When the decoder D is fed the class label $g^*(I)$, the variation T will then belong to the same class as the original image I. If in contrast the decoder D is supplied with a different class label $g_c^*(T) \neq g^*(I)$, the variation T will belong to the new class $g_c^*(T)$. The decoder D can be trained for this behavior. In this context, it is particularly advantageous that the decoder D is part of a transformer network. Via the "self-attention" mechanism, the information about the class label $g^*(I)$ or $g_c^*(T) \neq g^*(I)$ is shared with all tokens $r_1$* and $r_2$.

According to an example embodiment of the present invention, if the decoder D is fed a class label $g^*(I)$ or $g_c^*(T) \neq g^*(I)$ during the training, i.e. the representation in the form of the tokens $r_1$ and $r_2$ is expanded by this class label $g^*(I)$ or $g_c^*(T) \neq g^*(I)$, the transformer network learns in a supervised way which representations on the one hand and which class labels on the other hand belong together. Representations and class labels that belong together are thus embedded together in the space of representations. If later in the inference the class label is changed, i.e., a new class label is selected while the representation remains the same, the transformer network is instructed to search in a different part of the learned space of representations. Thus, tokens $r_1$ and $r_2$ are to be decoded on the basis of those data which the transformer network has seen previously for the region of the space of the representation as belonging to the new class label.

In a further particularly advantageous embodiment of the present invention, tokens r for patches p whose saliency evaluations $S_g(I)$, with respect to a prespecified classifier g, by a prespecified saliency method satisfy a prespecified criterion are selected as masked tokens $r_2$. A saliency method is a method that for an image I estimates which areas of this image I the specified classifier g has based its decision on. For example, by masking the information from patches p evaluated as particularly important by the saliency method, it can be checked whether the information ascertained as important by the saliency method is actually essential with respect to the decision boundary of the classifier g. The more this is the case, the more accurate and therefore better the saliency method is in concrete application.

Many saliency methods operate at the level of individual pixels. Therefore, advantageously pixel-wise saliency evaluations $S_g(I)$ for pixels contained in a patch p are aggregated to form one saliency evaluation of this patch p.

In a particularly advantageous embodiment of the present invention, a classification score g(T) which the specified classifier g of the variation T outputs for the class corresponding to the class label $g_c^*(T)$ is ascertained as value number for the saliency method with respect to the image I ascertained. This classification score g(T) indicates how confident the classifier g is in the assignment of the image I to the new class $g_c^*(T)$. The higher this classification score g(T), the more a modification of the image I, precisely in the areas identified as important by the saliency method, will carry this image I past the decision boundary of the classifier g to the new class $g_c^*(T)$.

In particular, for example, value numbers related to all the images I in a saliency test set $S_D$ of images I can be ascertained and aggregated to form an overall value number for the saliency method. The saliency test set $S_D$ can, for example, be compiled in such a way that it represents a representative cross-section of the images I occurring in the specific application.

According to an example embodiment of the present invention, optionally, in addition
- a distance in the classification space between the image I and its variation T, and/or
- a measure of how realistic the variation T is in the context of an intended application, can go into forming the value number.

The further the variation T is in the classification space from the image I, the greater the influence of the image portions evaluated as important by the saliency method. The more realistic the variation T is, the more relevant it is in the practical application. In other words, the saliency method should not "fake" a good evaluation with purely academic variations T that will not occur at all in the real application.

In a further particularly advantageous embodiment of the present invention, from one and the same image I, using a plurality of different configurations of masked tokens $r_2$, in each case a plurality of variations T are ascertained that a specified classifier g assigns to a different class $g_c^*(T) \neq g^*(I)$ than the class $g^*(I)$ of the image I. A configuration of masking tokens $r_2$ is then ascertained that is, according to a specified criterion, the minimum that is required for the variation T to change from the class $g^*(I)$ to the class $g_c^*(T) \neq g^*(I)$. As explained above, in this way it can be ascertained which image contents the decision between particular classes is mainly a function of.

In a further particularly advantageous embodiment of the present invention, the variation is T is labeled with a target class. A classifier g is trained in a supervised manner using the labeled variation T. For example, the labeled variation T can be added to an existing set of training examples, and the classifier can be trained or further trained on the thus expanded set of training examples. In this way, the training of the classifier g can be provided with additional illustrative material precisely in the vicinity of the decision boundary of this classifier g. The quality of the classifier is mainly measured precisely by the accuracy in the vicinity of the decision boundary. This is roughly comparable to the fact that in legal examinations, as a rule completely obvious situations are not posed as problems, but rather situations that lie at a decision boundary in one or more aspects. The majority of points are awarded for well-justified work at this decision boundary.

In another particularly advantageous embodiment of the present invention, the classifier g is supplied with images I that have been recorded with at least one sensor. From the output g(I) thereupon provided by the classifier g, a control signal is ascertained. A vehicle, a driving assistance system, a quality control system, a system for monitoring areas, and/or a medical imaging system, are controlled with this control signal. In this context, the training with the variations T has the effect that the decisions of the classifier g become reliable just at the decision boundary. This results in an increased degree of certainty that the response to the control signal executed by the respectively controlled system is appropriate to the situation represented by the images.

The present invention also provides a method for training a transformer network. This transformer network includes a patch encoding function $E_p$, an encoder E, and a decoder D, and is intended for use in the method described above.

In the context of this method, according to an example embodiment of the present invention, training examples for images I are provided. Using the method described above, these training examples are processed to form variations T. A prespecified cost function is used to evaluate how well the variations T approximate the original images I. Parameters that characterize the behavior of the transformer network are optimized with the goal that with further processing of training examples, the evaluation by the cost function can be expected to be improved.

At first this is the unsupervised training of the transformer network, operated as an autoencoder. This training is now expanded in that there is additionally a favorable evaluation by the cost function and/or the decoder D enforces that the variation T is assigned by a specified classifier g to the class $g^*(I)$ to which the relevant training example belongs.

For example, let $\Phi(I,T)$ be a cost function that measures the difference between the original image I and its reconstruction T (autoencoding loss). Then the total cost function L according to $$L=\Phi(I,T)+\lambda\psi_g(I,T)$$

can be expanded by a term $\lambda\psi_g(I,T)$ that measures the "distance" between the tasks g(I) and g(T) supplied by the classifier g for the image I and its reconstruction T. The price of this is that a further hyperparameter $\lambda$ is introduced that is to be optimized in the course of the training. Furthermore, there is no guarantee that those variations T for which $\lambda\psi_g(I,T)$ is optimal still lie in the desired domain or distribution of realistic, natural-looking images, from which the original image I also originates. That is, even adversarial-artificial changes in the variations T can be "rewarded" with a low value of the cost function L.

The introduction of the additional term $\lambda\psi_g(I,T)$ into the cost function L can be replaced by forcing the correct class assignment already in the decoder D. This means that the decoder D is supplied with the actual class assignment $g^*(I)$ and the decoder D ascertains the variation T under the constraint that this variation belongs to the class $g^*(I)$. The variation T thus results according to $$T=D(D_p(E(E_p(I))), g^*(I)).$$

For this purpose, for example, the decoder D can be set up as a conditional decoder, to which a target class $g^*(T)$ into which the classifier g should classify the variation T can be specified.

In another particularly advantageous embodiment of the present invention, a prespecified number N of masked tokens $r_2$ is successively reduced from an initial value as the training progresses. In this way, the transformer network can be gradually introduced to the task of finding a minimal modification of the image I that will move the image, from the viewpoint of the classifier g, from a first class $g^*(I)$ to another class $g_c^*(T)$.

In particular, according to an example embodiment of the present invention, the method can be fully or partially computer-implemented. Thus, the present invention also relates to a computer program having machine-readable instructions that, when they are executed on one or more computers and/or compute instances, cause the computer(s) and/or compute instances to carry out one of the described methods. In this sense, control devices for vehicles and embedded systems for technical devices that are also capable of executing machine-readable instructions are also to be regarded as computers. Examples of compute instances include virtual machines, containers, or serverless execution environments for executing machine-readable instructions in a cloud.

Likewise, the present invention also relates to a machine-readable data carrier and/or to a download product with the computer program. A download product is a digital product that is transferable via a data network, i.e. downloadable by a user of the data network, that can be offered for sale for example in an online shop for immediate download.

Furthermore, a computer can be equipped with the computer program, with the machine-readable data carrier, or with the download product.

Further measures that improve the present invention are described in more detail below together with the description of preferred exemplary embodiments of the present invention on the basis of figures.

DETAILED DESCRIPTION OF EXAMPLE EMBODIMENTS

Figure 1:
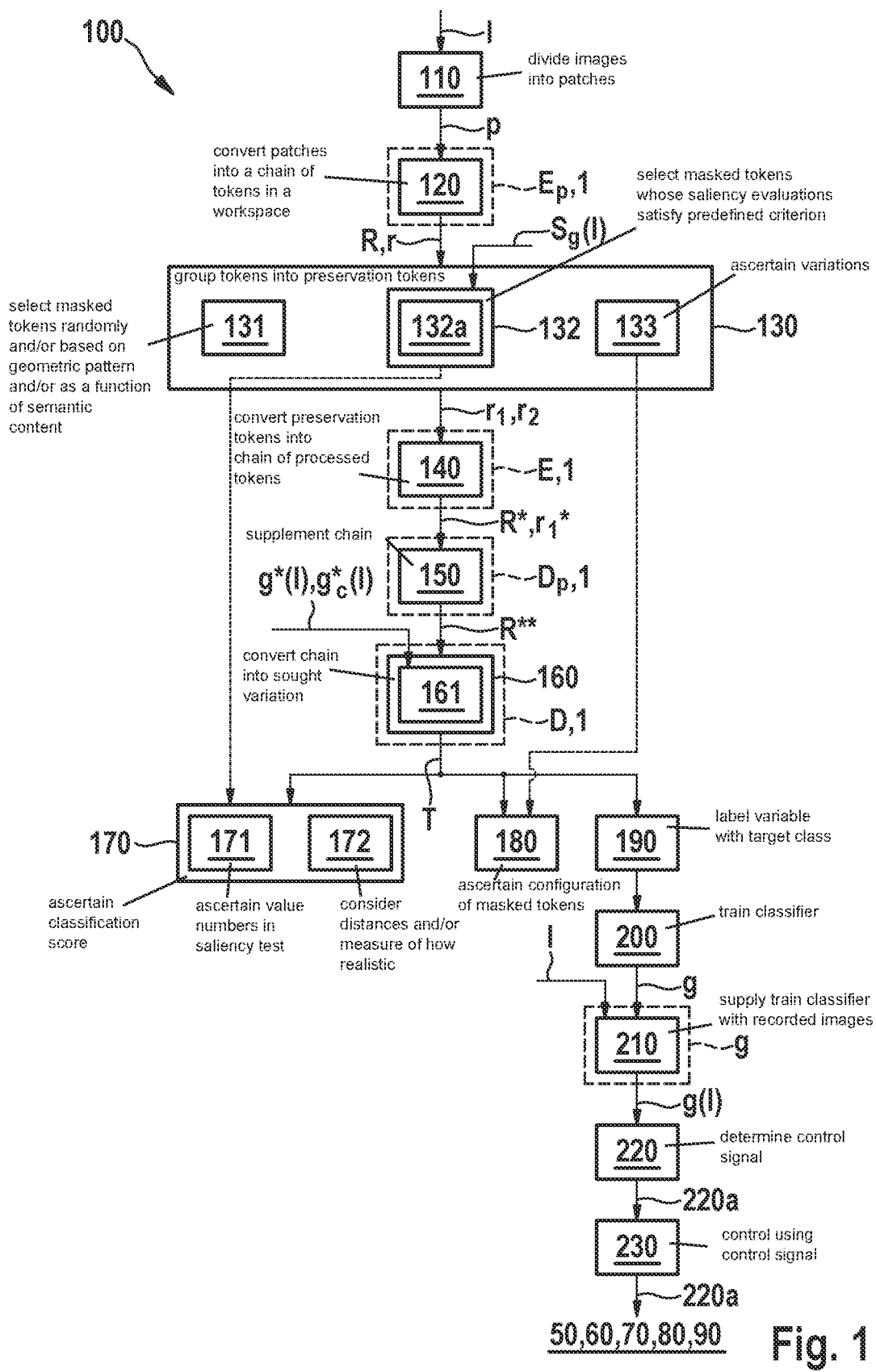
FIG. 1 shows an exemplary embodiment of a method 100 for generating a semantically modified variation T of an image I, according to the present invention.

FIG. 1 is a schematic flowchart of an embodiment of method 100 for generating a semantically modified variation T of an image I.

In step 110, the image I is divided into patches of equal size that do not overlap p.

In step 120, the patches p are converted with a patch encoding function $E_p$ of a transformer network 1 into a chain R of tokens r in a workspace.

In step 130, the tokens r are grouped into preservation tokens $r_1$, whose information is to be preserved in the variation, and masked tokens $r_2$, whose information is to be masked in the variation.

According to block 131, a prespecified number N of masked tokens $r_2$ can be selected
at random and/or
on the basis of a prespecified geometric pattern, and/or
as a function of the semantic content of the image I.

According to block 132, tokens r for patches p whose saliency evaluations $S_g(I)$, with respect to a prespecified classifier g, by a prespecified saliency method satisfy a prespecified criterion are selected as masked tokens $r_2$. Here, according to block 132a, pixel-wise saliency evaluations $S_g(I)$ for pixels contained in a patch p can be aggregated to form one saliency evaluation of this patch p.

According to block 133, from one and the same image I, using a plurality of different configurations of masked tokens $r_2$, in each case a plurality of variations T are ascertained (133) that a specified classifier g assigns to a different class $g_c^*(T) \neq g^*(I)$ than the class $g^*(I)$ of the image I.

In step 140, the preservation tokens $r_1$ are converted with an encoder E of the transformer network into a chain $R^*$ of processed tokens $r_1^*$.

In step 150, the chain $R^*$ is supplemented through application of an insertion operator $D_p$ which inserts these masked tokens $r_2$ at positions corresponding to the positions of the masked tokens $r_2$ in the original chain T to form a chain $R^{**}$ that represents the sought variation.

In step 160, the chain $R^{**}$ is converted with a decoder D of the transformer network into the sought variation T.

According to block 161, the decoder D is additionally assigned a class label $g^*(I)$ or $g_c^*(T) \neq g^*(I)$ which allows an assignment of the image I or its variation T to one or more classes of a prespecified classification.

If, in accordance with block 132, the masked tokens $r_2$ were selected on the basis of salience evaluations $S_g(I)$ by a prespecified saliency method, then in step 170 a classification score g(T) that the prespecified classifier g of the variation T outputs for the class corresponding to the class label $g_c^*(T)$ can be ascertained as a value number for the saliency method with respect to the image I. According to block 171, such value numbers related to all the images I in a saliency test set $S_D$ of images I can be ascertained and aggregated to form an overall value number for the saliency method. According to block 172, in addition
a distance in the classification space between the image I and its variation T, and/or a measure of how realistic the variation T is in the context of an intended application, can go into forming the value number.

If, according to block 133, a plurality of variations T of one and the same image I were ascertained, then in step 180 a configuration of masked tokens $r_2$ can be ascertained that, according to a specified criterion, is the minimum required for the variation T to change from the class $g^*(I)$ to the class $g_c^*(T) \neq g^*(I)$.

In step 190, the variation T is labeled with a target class.

In step 200, a classifier g is trained in a supervised manner using the labeled variation T.

In step 210, the trained classifier g is supplied with images I recorded with at least one sensor.

In step 220, from the output g(I) thereupon provided by the classifier g a control signal 220a is determined.

In step 230, a vehicle 50, a driving assistance system 60, a quality control system 70, a system 80 for monitoring areas, and/or a medical imaging system 90, are controlled with the control signal.

Figure 2:
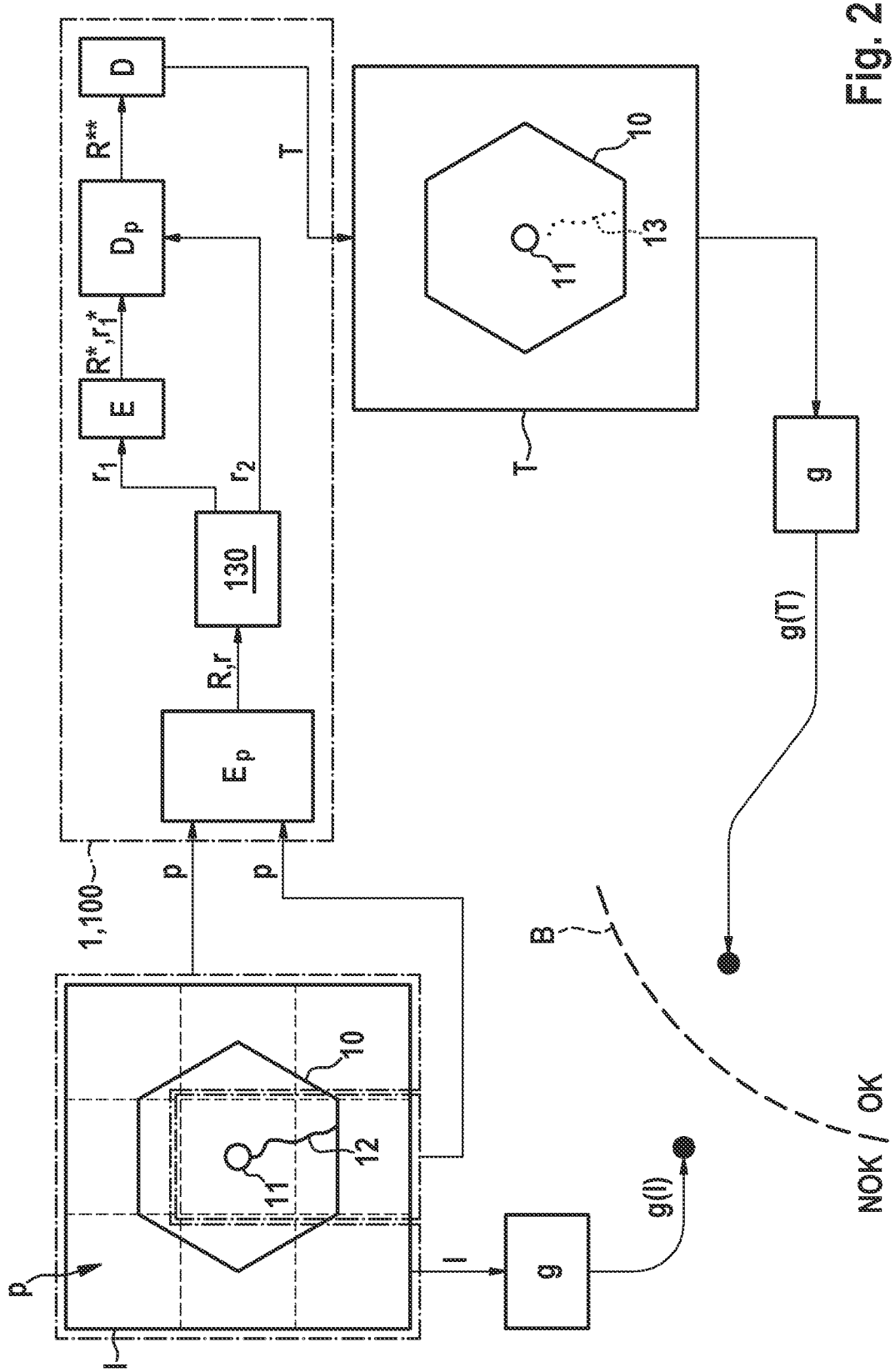
FIG. 2 shows an illustration of the effect of method 100 on the output of a classifier g, according to the present invention.

FIG. 2 illustrates how, with method 100 and transformer network 1, an image I can be modified to form a variation T in such a way that it can be placed, by a prespecified classifier g, on the other side of a decision boundary B from the original image I.

In the example shown in FIG. 1, the image I shows a nut 10 with a thread 11 in the center and a crack 12. Based on this crack, the image I is classified by the specified classifier g into the class "not OK=NOK."

The image I is divided into patches p. These patches p are converted by the patch encoding function $E_p$ into a chain R of tokens r. These tokens r are grouped in step 130 of method 100 into preservation tokens $r_1$ on the one hand and masked tokens $r_2$ on the other hand.

The preservation tokens $r_1$ are converted with the encoder E into the chain R* of processed tokens $r_1^*$. The insert operator D, combines these processed tokens $r_1^*$ with the masked tokens $r_2$ to form the chain R** by inserting these masked tokens $r_2$ at positions corresponding to the positions of the masked tokens $r_2$ in the original chain R.

The chain R** is converted with the decoder D into the sought variation T. In this variation T, where the crack 12 was visible in the original image I only small impurities 13 can now be seen. Therefore, the specified classifier g assigns this variation T to the class "OK." Because of the remaining impurities 13, the variation T is, however, closer to the decision boundary B than the original image I.

Figure 3:
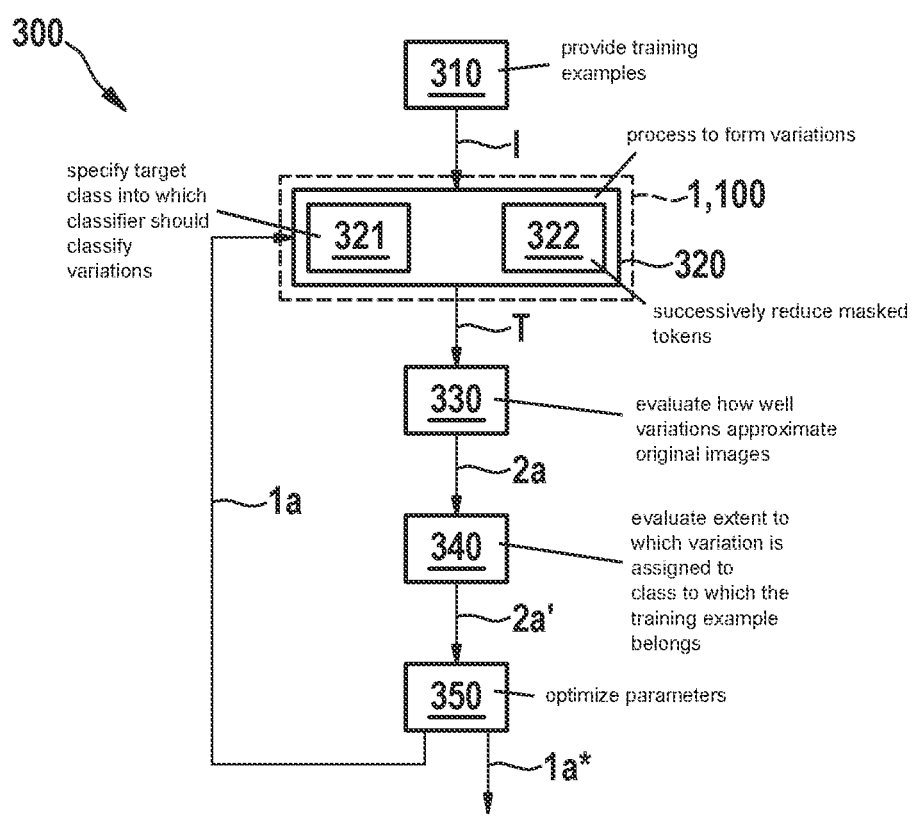
FIG. 3 shows an exemplary embodiment of method 300 for training transformer network 1, according to the present invention.

FIG. 3 is a schematic flowchart of an embodiment of method 300 for training a transformer network 1 usable in method 100 for just such a use.

In step 310, training examples for images I are provided.

In step 320, using the above-described method 100 the training examples are processed to form variations T.

According to block 321, the decoder D can be set up as a conditional decoder, to which a target class $g^*(T)$, into which the classifier g should classify the variation T, can be specified.

According to block 322, a prespecified number N of masked tokens $r_2$ is successively reduced starting from an initial value as the training progresses.

In step 330, a prespecified cost function 2 is used to evaluate how well the variations T approximate the original images I. In this process, a first evaluation 2a results.

In step 340, the cost function 2 is further used to evaluate the extent to which the variation T is assigned by a specified classifier g to the class $g^*(I)$ to which the respective training example belongs. This results in an evaluation $2a'$.

In step 350, parameters 1a that characterize the behavior of the transformer network are optimized with the goal that further processing of training examples will be expected to improve the evaluation 2a, 2a by the cost function 2. The finally trained state of these parameters 1a is designated by the reference sign $1a^*$.

What is claimed is:

1. A method for generating a semantically modified variation of an image, comprising the following steps:
dividing the image into equally sized, non-overlapping patches;
converting the patches with a patch encoding function of a transformer network into an original chain of tokens in a workspace;
grouping the tokens into preservation tokens whose information is to be preserved in the variation, and masked tokens whose information is to be masked in the variation;
converting the preservation tokens, with an encoder of the transformer network, into a chain of processed token;
supplementing the chain of processed token, through application of an insertion operator which inserts the masked tokens at positions corresponding to positions of the masked tokens in the original chain, to form a chain that represents a sought variation; and
converting the chain that represents the sought variation with a decoder of the transformer network into the sought variation.

2. The method as recited in claim 1, wherein a prespecified number of N of the masked tokens are selected:
at random and/or
based on a prespecified geometric pattern, and/or
as a function of a semantic content of the image.

3. The method as recited in claim 1, wherein the decoder D is assigned a class label $g^*(I)$ or $g_c^*(T) \neq g^*(I)$ that represents an assignment of the image I or its variation T to one or more classes of a prespecified classification.

4. The method as recited in claim 1, wherein the tokens for those of the patches whose saliency evaluations, with respect to a prespecified classifier, by a prespecified saliency method satisfy a prespecified criterion are selected as the masked token.

5. The method according to claim 4, wherein pixel-wise saliency evaluations for pixels contained in each patch are aggregated to form one saliency evaluation of the patch.

6. The method according to claim 4, wherein the decoder D is assigned a class label $g^*(I)$ or $g_c^*(T) \neq g^*(I)$ that represents an assignment of the image I or its variation T to one or more classes of a prespecified classification, and wherein a classification score g(T) that the prespecified classifier of the variation outputs for a class corresponding to the class label $g_c^*(T)$ is ascertained as value number for the saliency method with respect to the image I.

7. The method according to claim 6, wherein value numbers related to all the images I in a saliency test set of images I are ascertained and aggregated to form an overall value number for the saliency method.

8. The method as recited in claim 6, wherein:
a distance in the classification space between the image and its variation, and/or
a measure of how realistic the variation is in the context of an intended application,
additionally going into each value number.

9. The method as recited in claim 1, wherein, from one and the same image I, using several different configurations of masked tokens, a plurality of variations are ascertained that a specified classifier g assigns to a different class $g_c*(T) \neq g*(I)$ than a class $g*(I)$ of the image I; and a configuration of masked tokens $r_2$ being ascertained that is, according to a specified criterion, a minimum that is required for the variation to change from the class $g*(I)$ to the class $g_c*(T) \neq g*(I)$.

10. The method as recited in claim 1, the variation is labeled with a target class, and a classifier is trained in a supervised manner using the labeled variation.

11. The method as recited in claim 10, further comprising:
supplying the trained classifier with images recorded with at least one sensor;
from an output provided by the classifier based on the supplied images, ascertaining a control signal; and
controlling, with the control signal, a vehicle, and/or a driving assistance system, and/or a system for quality control, and/or a system for monitoring areas, and/or a system for medical imaging.

12. A method for training a transformer network that includes a patch encoding function, an encoder, and a decoder, comprising the following steps:
providing training examples images;
processing each image of the training example images to form variations, the processing including:
dividing the image into equally sized, non-overlapping patches,
converting the patches with a patch encoding function of a transformer network into an original chain of tokens in a workspace,
grouping the tokens into preservation tokens whose information is to be preserved in the variation, and masked tokens whose information is to be masked in the variation,
converting the preservation tokens, with an encoder of the transformer network, into a chain of processed token,
supplementing the chain of processed token, through application of an insertion operator which inserts the masked tokens at positions corresponding to positions of the masked tokens in the original chain, to form a chain that represents a sought variation, and
converting the chain that represents the sought variation with a decoder of the transformer network into the sought variation;
evaluating, using a prespecified cost function, how well the variations approximate the images; and
optimizing parameters that characterize a behavior of the transformer network with a goal that upon further processing of training examples, the evaluation by the cost function will be expected to improve;
wherein there is additionally a favorable evaluation by the cost function and/or the decoder enforces: that the variation is assigned by a specified classifier to a class to which the respective training example image belongs.

13. The method as recited in claim 12, wherein the decoder is a conditional decoder to which a target class can be specified into which the classifier should classify the variation.

14. The method as recited in claim 12, wherein a prespecified number of masked tokens are successively reduced starting from an initial value, as the training progresses.

15. A non-transitory machine-readable data carrier on which is stored a computer program for generating a semantically modified variation of an image, the computer program, when executed by one or more computers, causing the one or more computers to perform the following steps:
dividing the image into equally sized, non-overlapping patches;
converting the patches with a patch encoding function of a transformer network into an original chain of tokens in a workspace;
grouping the tokens into preservation tokens whose information is to be preserved in the variation, and masked tokens whose information is to be masked in the variation;
converting the preservation tokens, with an encoder of the transformer network, into a chain of processed token;
supplementing the chain of processed token, through application of an insertion operator which inserts the masked tokens at positions corresponding to positions of the masked tokens in the original chain, to form a chain that represents a sought variation; and
converting the chain that represents the sought variation with a decoder of the transformer network into the sought variation.

16. One or more computers configured to generate a semantically modified variation of an image, where each computer includes one or more processors coupled to a memory configured to:
divide the image into equally sized, non-overlapping patches;
convert the patches with a patch encoding function of a transformer network into an original chain of tokens in a workspace;
group the tokens into preservation tokens whose information is to be preserved in the variation, and masked tokens whose information is to be masked in the variation;
convert the preservation tokens, with an encoder of the transformer network, into a chain of processed token;
supplement the chain of processed token, through application of an insertion operator which inserts the masked tokens at positions corresponding to positions of the masked tokens in the original chain, to form a chain that represents a sought variation; and
convert the chain that represents the sought variation with a decoder of the transformer network into the sought variation.

* * * * *